United States Patent [19]

Andoh et al.

[11] Patent Number: 4,693,931
[45] Date of Patent: Sep. 15, 1987

[54] MAGNETIC RECORDING MEDIUM AND MAGNETIC PARTICLES THEREFOR

[75] Inventors: Haruo Andoh, Suita; Seiji Matsumoto, Sakai, both of Japan

[73] Assignees: Hitachi Maxell, Ltd.; Sakai Chemical Industry Co., Ltd., both of Osaka, Japan

[21] Appl. No.: 641,733

[22] Filed: Aug. 17, 1984

[30] Foreign Application Priority Data

Aug. 18, 1983 [JP] Japan ................................ 58-151116

[51] Int. Cl.$^4$ .............................................. B32B 5/16
[52] U.S. Cl. .................................. 428/328; 428/694; 428/900
[58] Field of Search ............... 428/694, 328, 900, 329; 252/62.54; 427/128

[56] References Cited

U.S. PATENT DOCUMENTS

| | | | |
|---|---|---|---|
| 4,239,637 | 12/1980 | Naruse | 252/62.54 |
| 4,363,850 | 12/1982 | Yasui et al. | 252/62.54 X |
| 4,404,260 | 9/1983 | Shibata | 428/694 X |
| 4,420,537 | 12/1983 | Hayama et al. | 428/694 X |
| 4,451,535 | 5/1984 | Pinguad et al. | 252/62.54 X |
| 4,500,599 | 2/1985 | Ogawa et al. | 427/128 X |
| 4,571,364 | 2/1986 | Kasuga et al. | 427/128 X |
| 4,584,242 | 4/1986 | Nagai et al. | 427/128 X |

FOREIGN PATENT DOCUMENTS

| | | | |
|---|---|---|---|
| 0147814 | 11/1979 | Japan | 428/694 |
| 0141606 | 11/1979 | Japan | 428/694 |
| 0147813 | 11/1979 | Japan | 428/694 |

*Primary Examiner*—Nancy A. Swisher
*Attorney, Agent, or Firm*—Birch, Stewart, Kolasch & Birch

[57] ABSTRACT

A magnetic recording medium comprising a nonmagnetic support and a magnetic layer provided thereon is disclosed. The magnetic layer comprises a magnetic recording element and a binder, wherein the magnetic recording element mainly comprises acicular gamma-$Fe_2O_3$ particles having an average porosity of not more than 5% by volume, a specific surface area of 24 to 30 m$^2$/g and the X-ray diffraction intensity at the face (210) to that at the face (311) of not more than 5%. The magnetic recording medium has improved electromagnetic conversion characteristics such as sensitivity and noise.

20 Claims, No Drawings

MAGNETIC RECORDING MEDIUM AND MAGNETIC PARTICLES THEREFOR

The present invention relates to a magnetic recording medium and magnetic particles therefor.

As the magnetic recording element in a magnetic recording medium, particularly for audio compact cassette tapes at the normal position, there have been used acicular particles of gamma-$Fe_2O_3$ having a coercive force of 250 to 500 oersteds in view of bias characteristics. These acicular particles of gamma-$Fe_2O_3$ are usually prepared by heating acicular particles of goethite (alpha-FeOOH) for dehydration, reducing the dehydrated product to magnetite ($Fe_3O_4$) and oxidizing this magnetite. In the above process, evaporation of water from acicular particles of goethite as the starting material takes place on the heating for dehydration so that micropores are formed in the acicular particles. As a result, the produced acicular particles of gamma-$Fe_2O_3$ have a high porosity, usually of about 8 to 10% by volume. Because of this high porosity, the Lorentz magnetic field due to the micropores is produced in each acicular particle, and each acicular particle assumes a multiple magnetic domain structure so that the apparent magnetic force of each acicular particle is lowered. The magnetic layer containing gamma-$Fe_2O_3$ acicular particles of the high porosity as above has many voids, and the entire volume of such voids may be as large as 10 to 20% of the magnetic layer. Accordingly, the attainment of a high packing density of the magnetic layer with the gamma-$Fe_2O_3$ acicular particles of high porosity is difficult.

Because of the above reason, a magnetic recording medium prepared by the use of conventional (high porosity) acicular particles of gamma-$Fe_2O_3$ is inferior in sensitivity within the region of audio frequency, particularly of low frequency.

Recently, there has been proposed a new process for the production of acicular particles of gamma-$Fe_2O_3$ having a low porosity which comprises heating an aqueous suspension of ferric hydroxide containing a certain specific crystallization controlling agent under an alkaline condition and subjecting the resulting alpha-$Fe_2O_3$ particles to reduction under heating and oxidation.

Attempts have been made to use the above prepared gamma-$Fe_2O_3$ acicular particles for a magnetic recording element so as to enhace sensitivity characteristics. As a result, it has been observed that their use produces enhancement of the sensitivity to a certain extent in comparison with the use of conventional gamma-$Fe_2O_3$ acicular particles. However, it was also observed that the gamma-$Fe_2O_3$ acicular particles of low porosity do not always produce the desired enhancement of sensitivity.

Subsequent studies have revealed that among gamma-$Fe_2O_3$ acicular particles of low porosity, those having a specific surface area of 24 to 30 $m^2/g$ and the intensity at the face (210) to that at the face (311) in the X ray diffraction of not more than 5% contribute greatly to remarkable enhancement of sensitivity and yet can afford a magnetic recording medium of low noise. This invention is based on this finding.

According to the present invention, there is provided a magnetic recording element comprising acicular particles of gamma-$Fe_2O_3$ having an average porosity of not more than 5% by volume, a specific surface area of 24 to 30 $m^2/g$ and the intensity at the face (210) to the intensity at the face (311) in X ray diffraction of not more than 5%. There is also provided a magnetic recording medium comprising a non-magnetic support and a magnetic layer provided thereon, the magnetic layer comprising the magnetic recording element and a binder.

For preparation of gamma-$Fe_2O_3$ acicular particles to be used as the present magnetic recording element of the present invention, an aqueous suspension of ferric hydroxide containing a crystallization controlling agent and optionally a seed crystal of alpha-ferric oxide under an alkaline condition is heated, the resulting alpha-$Fe_2O_3$ particles are reduced under heating to give magnetite, and the magnetite is then subjected to oxidation (cf. Japanese Patent Publn. (examined) Nos. 4694/80, 22416/80 and 17290/81; Japanese Patent Publn. (unexamined) No. 92527/82; U.S. Pat. No. 4,202,871, etc.).

The crystallization controlling agent may be chosen from water-soluble compounds having a coordinating property to iron. Examples are polycarboxylic acids, hydroxycarboxylic acids, aminocarboxylic acids, polyamines, organic sulfonic acids, thiocarboxylic acids, polyvalent alcohols, beta-dicarbonyl compounds, aromatic sulfonic acids, etc. Their salts such as phosphates, esters, etc. are also usable.

The pH of the aqueous suspension of ferric hydroxide, the temperature of such aqueous suspension, the kind of the crystallization controlling agent, etc. may be appropriately selected so as to obtain ultimately the gamma-$Fe_2O_3$ acicular particles having the desired properties.

For instance, when using aminotrimethylene-phosphonic acid as the crystallization controlling agent, its amount may be not less than 0.5% by weight, preferably not more than 10% by weight, to ferric hydroxide as the starting material. Further, the pH of the aqueous suspension may be adjusted to be not more than 12.5, preferably not less than 9. Furthermore, the temperature of the aqueous suspension may be kept at 30° to 80° C.

Usually, the temperatures on preparation of alpha-$Fe_2O_3$ particles from ferric hydroxide, reduction of alpha-$Fe_2O_3$ particles to magnetite and oxidation of magnetite to gamma-$Fe_2O_3$ particles may be respectively controlled to about 30°–80° C., about 250°–550° C. and about 150°–350° C.

The gamma-$Fe_2O_3$ acicular particles of this invention have an average porosity of not more than 5% by volume, preferably of not more than 2% by volume. By this characteristic feature, the formation of the multiple magnetic domain structure is prevented. Further, the void ratio is decreased so that a high packing density can be attained in the magnetic layer. The gamma-$Fe_2O_3$ acicular particles also have a specific surface area of 24 to 30 $m^2/g$ and the intensity at the face (210) to that at the face (311) in X ray diffraction of not more than 5%. These characteristic features are effective in enhancing the functions so that the dispersibility of the acicular particles in the magnetic coating composition is good and the sensitivity characteristics of the acicular particles are improved. In addition, noise is substantially lowered. The reason and mechanism behind why the above advantageous performances can be produced are still not clear.

In addition to the characteristic features as defined above, the gamma-$Fe_2O_3$ acicular particles of the present invention are preferred to have an average size of the long axis of 0.25 to 0.5 $\mu m$ and an average axis ratio (average size of short axis/average size of long axis) of 5 to 10. When the average size of the long axis is too small, sensitivity characteristics are lowered. When too large, noise is not sufficiently lowered.

The magnetic recording medium of the present invention is characteristic in using gamma-$Fe_2O_3$ acicular particles as defined above for the magnetic recording element. Insofar as the advantageous performances are not substantially deteriorated, however, the magnetic recording element may include any other magnetic particles in addition to the gamma-$Fe_2O_3$ acicular particles. For instance, the magnetic recording element may contain conventional gamma-$Fe_2O_3$ acicular particles, gamma-$Fe_2O_3$ particles of low porosity having the intensity at the face (210) to that at the face (311) in X ray diffraction of more than 5%, gamma-$Fe_2O_3$ acicular particles of low porosity having a specific surface area of less than 24 $m^2/g$ or more than 30 $m^2/g$, or the like in an amount of not more than 50% by weight on the basis of the total amount of the magnetic particles in the magnetic recording element.

For preparation of the magnetic recording medium, a magnetic coating composition comprising the magnetic recording element and a binder may be applied onto a non-magnetic support such as a polymeric film (e.g. polyethylene terephthalate film, polyvinyl acetate film) to make a coating layer having a desired thickness (usually 4 to 7 μm after drying), following by treatment for orientation and drying. The thus formed magnetic layer may be, if desired, subjected to any further treatment such as super calendering.

The magnetic coating composition comprises the magnetic recording element and the binder in a liquid medium. As the binder, there may be used vinyl chloride/vinyl acetate copolymer, polyurethane resin, cellulose resin, etc. Among them, the use of vinyl chloride/vinyl acetate copolymer having a hydroxyl group and/or a carboxyl group and/or cellulose resin having a hydroxyl group and/or a carboxyl group with or without polyurethane resin is preferred, because gamma-$Fe_2O_3$ acicular particles as defined above show very good dispersibility into this binder so that the increase of sensitivity and the decrease of noise can be well attained. As the liquid medium, an organic solvent is usually employed, although other solvents can also be used. Examples of the organic solvent are acetone, methylisobutylketone, methylethylketone, cyclohexanone, ethyl acetate, tetrahydrofuran, toluene, xylene, etc. and their mixtures. The contents of the magnetic recording element and the binder in the magnetic coating composition are not limitative, but usually the weight proportion of the magnetic recording element and the binder in such composition is from 6:4 to 9:1.

In addition to the above essential components, the magnetic coating composition may include additionally a dispersant, a lubricant, an antistatic agent, a non-magnetic pigment, etc. Especially, the use of a phosphoric ester surfactant of the formula:

$$[RO(CH_2CH_2O)_n]_m PO(OH)_{3-m}$$

wherein R is an alkyl group having 8 to 30 carbon atoms or an alkylphenyl group of which the alkyl moiety has 2 to 30 carbon atoms, m is an integer of 1 or 2 and n is an integer of 2 to 10 as a dispersant is favorable, because of the good dispersibility of gamma-$Fe_2O_3$ acicular particles as discussed above. The content of these additives in the magnetic coating composition is normally not more than 10% by weight.

The magnetic layer formed by the above use of the magnetic coating composition usually affords a coercive force of 250 to 500 oersteds. Its void ratio is lower than that of a magnetic layer formed by the use of the magnetic coating composition comprising conventional gamma-$Fe_2O_3$ acicular particles; usually, it is lower than 10% by volume, preferably between 3 and 9% by volume. Due to such a low void ratio, a high packing density can be attained.

The magnetic recording medium of the present invention is greatly improved in electromagnetic conversion characteristics such as sensitivity and noise.

Practical and preferred embodiments of the present invention are illustratively shown in the following Examples wherein % and part(s) are by weight. The physical properties were determined as follows:

Porosity

Using a nitrogen gas adsorption apparatus according to the volume method, the adsorption isothermal line was measured, and the porosity was determined from the Pore's volume fraction rate as obtained from the hysteresis between adsorption and desorption.

Void ratio

With the assumption of the weight proportion of the magnetic recording element and the binder in the magnetic layer being 80:20, the void ratio was calculated according to the following formula:

$$\left\{ 1 - \frac{Bm}{4\pi\rho_1\sigma s \cdot \left(\frac{80/\rho_1}{80/\rho_1 + 20/\rho_2}\right)} \right\} \times 100 \, (\%)$$

wherein Bm(g) is the maximum magnetic flux density of the test tape, σs (emu/g) is the saturation magnetization of the magnetic particles, $\rho_1$ is the density of the magnetic particles and $\rho_2$ is the density of the binder.

Specific surface area

The specific surface area was determined by the use of a surface area pore-volume analyzer ("Model 2100D ORR" manufactured by Micromeritics (Co., Ltd.) according to the BET method due to nitrogen gas adsorption.

X ray diffraction measurement

Using an X ray diffraction apparatus ("SG-7"; manufactured by Rigaku Denki Co., Ltd.) with a target of Fe, measurement was effected with an impressed voltage-current value of the X ray tubular bulb of 40 KV-20 mA.

EXAMPLE 1

Preparation of gamma-$Fe_2O_3$ particles

To an aqueous solution of ferric sulfate (iron concentration, 21.2 g/liter; 2 liters), 10% aqueous solution of sodium hydroxide was added to yield a pH of 8.0, whereby a red brown precipitate of ferric hydroxide was produced. To one liter of the resulting suspension, aminotri(methylenephosphonic acid) (0.96 g) and 1-hydroxyethylene-1,1'-diphosphonic acid (0.32 g) were added, and the resultant mixture was adjusted to pH 10.8 with 5% aqueous solution of sodium hydroxide. The resulting mixture was agitated in a sealed vessel for 60 minutes while heating at 170° C. The produced red orange precipitate was collected by filtration, washed with water and dried to give red particles (60 g).

On microscopic observation, those particles were confirmed to be acicular crystals having an average long axis of 0.5 micron and an average short axis of 0.06 micron. By X ray diffraction, they were identified as alpha-$Fe_2O_3$ particles.

The above obtained alpha-$Fe_2O_3$ particles were heated in steam at 400° C. for reduction. Then, those particles were oxidized in the air at 200° C. to give gamm-$Fe_2O_3$ particles having a porosity of 0% by volume and the intensity at the face (210) to that at the face (311) in the X ray diffraction being 1.8%. Further, the particles have the following physical constants: specific surface area, 27 $m^2/g$; average size of long axis, 0.5 micron; average axis ratio, 8; coercive force, 370 oersteds.

Manufacture of Magnetic recording tape

The following materials were mixed together by the aid of a ball mill for 70 hours to give a magnetic coating composition:

|  | Part(s)) |
|---|---|
| gamma-$Fe_2O_3$ particles as prepared above | 240 |
| Vinyl chloride/vinyl acetate/vinyl alcohol terpolymer "VAGH" (manufactured by Union Carbide Corp.) | 32 |
| Urethane elastomer "Pandex T-5201" (manufactured by Dainippon Ink KK) | 19 |
| Trifunctional low molecular weight isocyanate compound "Colonate L" (manufactured by Nippon Polyurethane Kogyo) | 9 |
| Palmitic acid | 2.4 |
| Methylisobutylketone | 225 |
| Toluene | 225 |

The magnetic coating composition was applied onto the surface of a polyester film of 11 μm in thickness to make a coating layer of 5 μm in thickness after drying. After drying, the film was subjected to calendering treatment and cut in a width of 1/7 inch to make a magnetic recording tape.

EXAMPLE 2

In the same manner as in Example 1, there were produced acicular gamma-$Fe_2O_3$ particles having a porosity of 4% by volume and the intensity at the face (210) to that at the face (311) in X ray diffraction being 4%. The particles had a specific surface area of 27 $m^2/g$, an average size of long axis of 0.4 μm, an average axis ratio of 8 and a coercive force of 365 oersteds.

In the same manner as in Example 1 but using acicular gamma-$Fe_2O_3$ particles, there was manufactured a magnetic recording tape.

Comparative Example 1

In the same manner as in Example 1 but using conventional acicular gamma-$Fe_2O_3$ particles having a porosity of 8% by volume and the intensity at the face (210) to the intensity at the face (311) in the X ray diffraction being 1.5%, there was manufactured a magnetic recording tape. The particles as used above had a specific surface area of 28 $m^2/g$, an average particle size of the long axis of 0.5 μm, an average axis ratio of 9 and a coercive force of 365 oersteds.

Comparative Example 2

In the same manner as in Example 1, there were prepared acicular gamma-$Fe_2O_3$ particles having a porosity of 4% by volume and the intensity at the face (210) to that at the face (311) in X ray diffraction of 5.9%. The particles had an average particle size of the long axis of 0.5 μm, an average axis ratio of 8 and a coercive force of 370 oersteds.

In the same manner as in Example 1 but using the particles as obtained above, there was manufactured a magnetic recording tape.

Comparative Example 3

In the same manner as in Example 1, there were prepared acicular gamma-$Fe_2O_3$ particles having a porosity of 4% by volume and the intensity at the face (210) to that at the face (311) in the X ray diffraction of 4.0%. The particles had a specific surface area of 35 $m^2/g$, an average particle size of the long axis of 0.3 μm, an average axis ratio of 8 and a coercive force of 375 oersteds.

In the same manner as in Example 1 but using the particles as obtained above, there was manufactured a magnetic recording tape.

The physical properties of gamma-iron oxide particles as used in the Examples and Comparative Examples as well as the conditions under which those particles were prepared are shown in Table 1.

TABLE 1

| | Porosity (%) | (210)/(311) intensity ratio (%) | Specific surface area ($m^2/g$) | Crystallization controlling agent Kind | Amount (%)* | pH | Temp. (°C.) |
|---|---|---|---|---|---|---|---|
| Example | | | | | | | |
| 1 | 0 | 1.8 | 27 | Aminotrimethylene-phosphonic acid (0.96 g) + 1-Hydroxy-ethylene-1,1'-diphosphonic acid (0.32 g) | 1.6 | 8.0 | 50 |
| 2 | 4 | 4.0 | 27 | Aminotrimethylene-phosphonic acid | 1.2 | 12.0 | 60 |
| Comparative | | | | | | | |
| 1 | 8 | 15 | 28 | None | | | |
| 2 | 4 | 5.9 | 29 | Same as in Ex. 1 | 0.8 | 13.0 | 70 |

TABLE 1-continued

| Porosity (%) | (210)/(311) intensity ratio (%) | Specific surface area (m²/g) | Crystallization controlling agent Kind | Amount (%)* | pH | Temp. (°C.) |
|---|---|---|---|---|---|---|
| 3 | 4 | 4.0 | 35 | Same as in Ex. 1 | 1.0 | 11.0 | 90 |

Note:
*indicated by weight % to the amount of ferric hydroxide.

EXAMPLE 3

In the same manner as in Example 1 but incorporating additionally a phosphate surfactant "Gafac RS-410" (manufactured by Toho Chemical Ind. Ltd.) (2.4 parts) into the magnetic coating composition, there was manufactured a magnetic recording tape.

EXAMPLE 4

In the same manner as in Example 1 but incorporating vinyl chloride/vinyl acetate polymer "VYHH" (manufactured by Union Carbide Corp.) (32 parts) in place of "VAGH" (32 parts), there was manufactured a magnetic recording tape.

Comparative Example 4

In the same manner as in Example 1 but using conventional acicular gamma-Fe₂O₃ particles as used in Comparative Example 1 and incorporating vinyl chloride/vinyl acetate polymer "VYHH" (32 parts) in place of "VAGH" (32 parts), there was manufactured a magnetic recording tape.

Comparative Example 5

In the same manner as in Example 1 but using acicular gamma-Fe₂O₃ particles as used in Comparative Example 2 and incorporating vinyl chloride/vinyl acetate polymer "VYHH" (32 parts) in place of "VAGH" (32 parts), there was manufactured a magnetic recording tape.

Electromagnetic conversion characteristics as well as the coercive force and the void of the magnetic layer were determined on each of the magnetic recording tapes as obtained in the above Examples and Comparative Examples. The results are shown in Table 2.

TABLE 2

| | Sensitivity (315 Hz) | Reference tape ratio (dB) 6.3 KHz | 12.5 KHz | AC bias noise Reference tape ratio (dB) | Coercive force (Oe) | Void (%) |
|---|---|---|---|---|---|---|
| Example | | | | | | |
| 1 | +1.0 | +2.1 | +2.6 | −1.8 | 375 | 7.1 |
| 2 | +0.6 | +1.6 | +1.9 | −2.0 | 375 | 9.5 |
| 3 | +1.3 | +2.7 | +3.2 | −1.6 | 365 | 5.6 |
| 4 | +2.0 | +0.6 | +0.8 | −1.4 | 375 | 11.7 |
| Comparative | | | | | | |
| 1 | +0.2 | +1.0 | +1.3 | −1.2 | 370 | 15.3 |
| 2 | +0.4 | +1.1 | +1.4 | −1.2 | 375 | 12.7 |
| 3 | −1.0 | +0.2 | +0.5 | −2.5 | 375 | 28.5 |
| 4 | −0.5 | −0.7 | −0.5 | −1.5 | 375 | 18.2 |
| 5 | −0.3 | −0.4 | −0.2 | −1.5 | 380 | 16.5 |

From the above table, it is understood that the magnetic recording tapes of the present invention (Examples 1 to 4) are low in the void of the magnetic layer and excellent in comparison with those of the magnetic recording tapes using conventional acicular gamma-Fe₂O₃ (Comparative Examples 1 and 4) or using gamma-Fe₂O₃ outside the scope of the present invention (Comparative Examples 2, 3 and 5).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a non-magnetic support and a magnetic layer provided thereon, said magnetic layer comprising a binder and a magnetic recording element which comprises acicular gamma-Fe₂O₃ particles having an average porosity of not more than 5% by volume, a specific surface area of 24 to 30 m²/g and an intensity at the face (210) to that at the face (311) in X ray diffraction of not more than 5%.

2. The magnetic recording medium according to claim 1, wherein the binder comprises at least one member selected from the group consisting of vinyl chloride/vinyl acetate copolymers having a hydroxyl group and/or a carboxyl group and cellulose resins having a hydroxyl group and/or a carboxyl group.

3. The magnetic recording medium according to claim 2, wherein the magnetic layer comprises further a phosphate surfactant of the formula:

$$[RO(CH_2CH_2)_n]_mPO(OH)_{3-m}$$

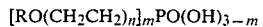

wherein R is an alkyl or alkylphenyl group having 8 to 30 carbon atoms, m is an integer of 1 or 2 and n is an integer of 2 to 10.

4. The magnetic recording medium according to claim 1, wherein the magnetic layer includes a phosphate surfactant of the formula:

$$[RO(CH_2CH_2)_n]_mPO(OH)_{3-m}$$

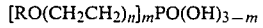

wherein R is an alkyl or alkylphenyl group having 8 to 30 carbon atoms, m is an integer of 1 or 2 and n is an integer of 2 to 10.

5. Magnetic particles for a magnetic recording medium which comprise acicular gamma-Fe₂O₃ particles having an average porosity of not more than 5% by volume, a specific surface area of 24 to 30 m²/g and an intensity at the face (210) to that at the face (311) in X ray diffraction of not more than 5%.

6. The magnetic particles of claim 5, which have an average long axis size of 0.25 to 0.5 micron and an average axis ratio (average size of short/axis average size of long axis) of 5 to 10.

7. The magnetic recording medium of claim 1, wherein the acicular gamma-Fe₂O₃ particles have an average long axis size of 0.25 to 0.5 micron and an average axis ratio (average size of short axis/average size of long axis) of 5 to 10.

8. The magnetic recording medium of claim 1, wherein the magnetic recording element further contains gamma-$Fe_2O_3$ particles having an X-ray diffraction intensity at the face (210) to that at the face (311) of more than 5%.

9. The magnetic recording medium of claim 8, wherein the magnetic recording element further contains gamma-$Fe_2O_3$ particles having a specific surface area of less than 24 $m^2/g$ or more than 30 $m^2/g$.

10. The magnetic recording medium of claim 9, wherein the additional $Fe_2O_3$ particles are present in an amount of not more than 50% by weight based on the total amount of the magnetic particles in the magnetic recording element.

11. The magnetic recording medium of claim 8, wherein the additional $Fe_2O_3$ particles are present in an amount of not more than 50% by weight based on the total amount of the magnetic particles in the magnetic recording element.

12. The magnetic recording medium of claim 1, wherein the non-magnetic support is a polymeric film of polyethylene terephthalate or polyvinyl acetate.

13. The magnetic recording medium of claim 12, wherein the magnetic layer is applied to the non-magnetic support to a thickness of 4 to 7 microns.

14. The magnetic recording medium of claim 1, wherein the magnetic recording element and binder are provided in a liquid medium selected from the group consisting of acetone, methylisobutylketone, methylethylketone, cyclohexanone, ethyl acetate, tetrahydrofuran, toluene and xylene.

15. The magnetic recording medium of claim 1, wherein the contains at least one member selected from the group consisting of a dispersent, a lubricant, an antistatic agent, and a non-magnetic pigment.

16. The magnetic recording medium of claim 1, wherein the magnetic layer has a coercive force of 250 to 500 oersteds.

17. A magnetic recording medium comprising a non-magnetic support and a magnetic layer provided thereon, said magnetic layer comprising a binder and a magnetic recording element which comprises as a major portion thereof acicular gamma-$Fe_2O_3$ particles having an average porosity of not more than 5% by volume, a specific surface area of 24 to 30 $m^2/g$ and an intensity at the face (210) to that at the face (311) in X-ray diffraction of not more than 5%.

18. The magnetic recording element of claim 17, which includes acicular gamma-$Fe_2O_3$ particles having an X-ray diffraction intensity at the face (210) to that at the face (311) of more than 5%, a specific surface area of less than 24 $m^2/g$ or more than 30 $m^2/g$ in an amount of not more than 50% by weight on the basis of the total amount of magnetic particles in the magnetic recording element.

19. The magnetic recording medium according to claim 17, wherein the binder comprises at least one member selected from the group comprising of vinyl chloride/vinyl acetate copolymers having a hydroxyl group and/or a carboxyl group and cellulose resins having a hydroxyl group and/or a carboxyl group.

20. The magnetic recording medium according to claim 17, wherein the magnetic layer includes a phosphate surfactant of the formula:

$$[RO(CH_2CH_2)_n]_m PO(OH)_{3-m}$$

wherein R is an alkyl or alkylphenyl group having 8 to 30 carbon atoms, m is an integer of 1 or 2 and n is an integer of 2 to 10.

* * * * *